United States Patent [19]

Tojo

[11] 4,017,682
[45] Apr. 12, 1977

[54] RADIO FREQUENCY CONVERTER

[75] Inventor: Takayuki Tojo, Yokohama, Japan

[73] Assignee: Victor Company of Japan, Limited, Japan

[22] Filed: Aug. 6, 1974

[21] Appl. No.: 495,298

[30] Foreign Application Priority Data

Aug. 9, 1973 Japan ............................... 48-93107
Oct. 15, 1973 Japan ............................. 48-118699
Oct. 15, 1973 Japan ............................. 48-118700

[52] U.S. Cl. .......................... 358/167; 179/15 FD
[51] Int. Cl.² ...................... H04N 5/38; H04N 7/06
[58] Field of Search .......... 178/6.8, 7.1, 7.2, 5.8 R, 178/5.6, DIG. 23; 179/15 FD; 358/12

[56] References Cited
UNITED STATES PATENTS 3,775,555  11/1973  Carlson ............................... 178/6.8

Primary Examiner—Robert L. Griffin
Assistant Examiner—Marc E. Bookbinder
Attorney, Agent, or Firm—Robert E. Burns; Emmanuel J. Lobato; Bruce L. Adams

[57] ABSTRACT

A radio frequency converter adapted for use with an image pick-up system having separate channels such as a television transmitter or a video tape recording-reproducing apparatus is provided with a single frequency multiplier having a resonant circuit with a characteristic curve which encompasses the frequencies of the video carriers to eliminate spurious noise due to switching between the separate channels. The converter is further provided with a single trap circuit which eliminates all of the unwanted lower side band frequencies of the sound signals to eliminate spurious noise due to switching between the separate channels.

6 Claims, 8 Drawing Figures

RADIO FREQUENCY CONVERTER

This invention relates to radio frequency converters, and particularly to a radio frequency converter for very-high and ultra-high frequency image pick-up systems in which spurious noise due to switching between separate video channels is effectively eliminated.

In prior art radio frequency converters for the very-high frequency range a disadvantage has been encountered in that spurious noise is generated in both video and sound signals when switching is made between separate channels since use is made of separate frequency multipliers for video carriers and corresponding trap circuits for eliminating unwanted lower side band frequencies in combination with respective changeover switches. With another type of prior art radio frequency converter, particularly for ultra-high frequency transmission, in shifting of the image pick-up system, in which the frequency converter is used, from one location where one sound carrier is used to another where a different sound carrier is used, the user has to replace the original sound carrier oscillator with a new one to conform with the sound carrier used in the local area.

Therefore, an object of the present invention is to provide a frequency converter in which spurious noise due to mechanical switching between the video carriers and the lower side band frequency of a sound signal is eliminated.

Another object of the invention is to provide a frequency converter in which a single frequency miltiplier is employed having a resonant circuit with a pass band or resonant characteristic encompassing a plurality of video carrier frequencies.

A still another object of the invention is to provide a frequency converter which is simple in configuration and compact in size.

A further object of the invention is to provide a frequency converter in which a single trap circuit is employed which eliminates a plurality of lower side band frequencies of corresponding sound signals.

A still further object of the invention is to provide a single sound carrier oscillator with a changeover switch for selectively producing a plurality of sound carriers to enable the same to be switches from one to another when the image pick-up system is shifted from one location to another.

The invention will be understood from the following description taken in conjunction with the accompanying drawings, in which.

Figure 1:
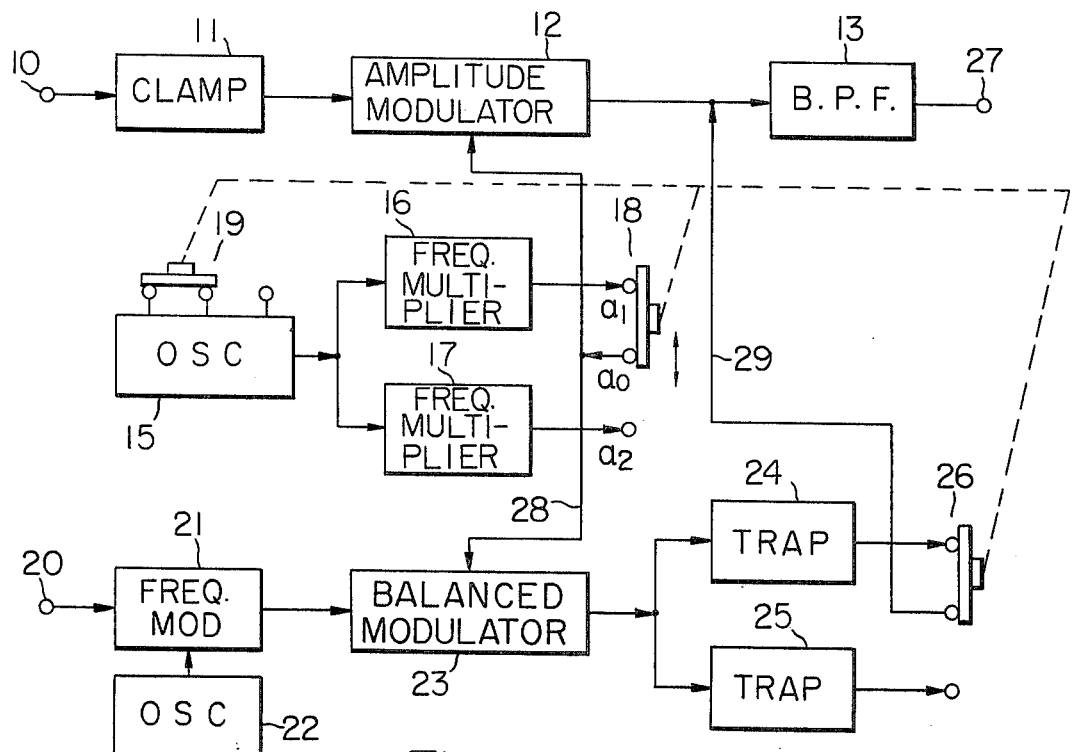
FIG. 1 is a schematic circuit diagram of a prior art radio frequency converter in the very-high frequency range.

Referring now to FIG. 1, there is shown a prior art radio frequency converter of very-high frequency range which is adapted for use with an image pick-up system such as a television transmitter or a video tape according-reproducing apparatus. A video signal as obtained by a television camera tube such as a vidicon (not shown) is applied to input terminals 10 and clamped by a clamp circuit 11 in the usual manner. The clamped video signal is used to modulate one of the video carriers allotted to a plurality of separate channels of the image pickup system. An oscillator 15 generates a plurality of fundamental frequency signals that are selectively switched by means of a changeover switch 19. The selected frequency signal is applied to frequency multipliers 16 and 17 each of which is a harmonic conversion transducer in which the frequency of the output signal is an exact integral multiple of the input frequency. The respective frequency multipliers 16, 17 are respectively tuned to the output frequencies $nf_1$ and $nf_2$, where $f_1$, $f_2$ are the two output frequencies of oscillator 15. Each of the output signals is used as the video carrier as referred to above and is selectively applied through a switch 18 ganged to the switch 19 to an amplitude modulator 12 in which the video carrier is modulated in amplitude in accordance with the video signal. On the other hand, a sound or audio, signal is applied to sound input terminals 20 and frequency-modulated by a modulator 21 to which a sound barrier signal is supplied from an oscillator 22. The frequency-modulated sound signal is applied to a balanced modulator 23 in which the frequency-modulated audio signal is combined with the signal at a video frequency supplied from one of the frequency multipliers 16 and 17 on conductor 28. This results in generation of upper and lower side band signals at frequencies deviated from a center frequency equal to the frequency of the signal applied by a respective one of the multipliers 16 and 17 to the balanced modulator 23. Trap circuits on band rejection filters 24 and 25 are provided to eliminate unwanted lower side band sound signals corresponding to the separate channels and the upper side band signals are selectively applied by a switch 26 ganged to switches 18 and 19 on conductor 29 through a band-pass filter 13 to which the amplitude-modulated video signal is also applied, to output terminals 27. However, with the prior art arrangement, spurious noise is generated as the switches 18 and 26 are actuated when channel selection is effected.

Figure 2:
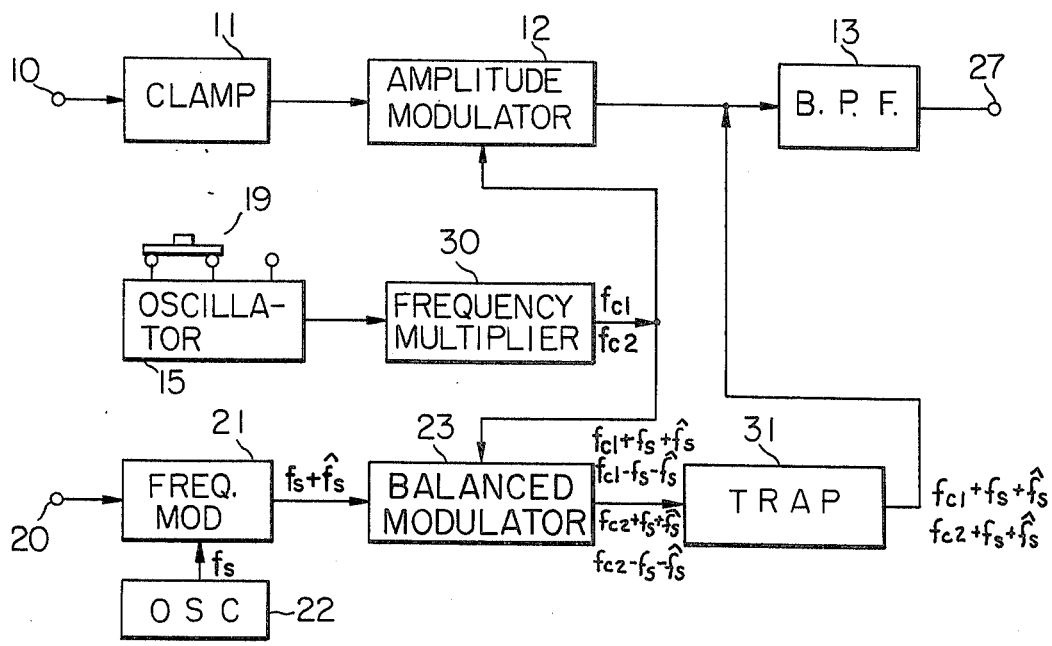
FIG. 2 is a schematic circuit diagram of a radio frequency converter of the present invention for use in the very high frequency range.
Figure 3:
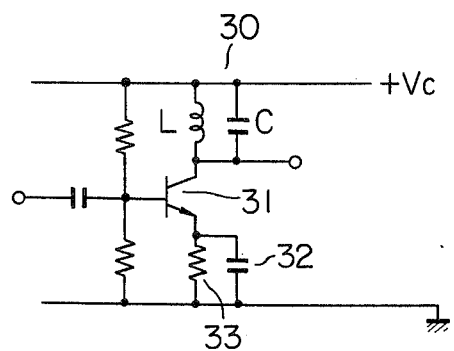
FIG. 3 is a circuit diagram of a frequency multiplier employed in the radio frequency converter of FIG. 2.
Figure 4:
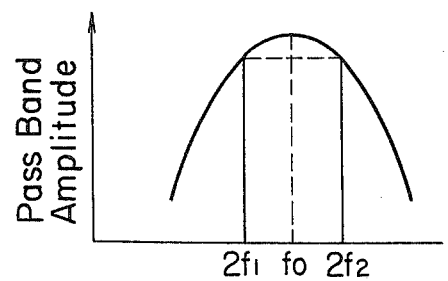
FIG. 4 is a graphic representation of the pass band vs frequency characteristic curve of a resonant circuit employed in the frequency multiplier of FIG. 3.

A radio frequency converter according to the present invention is shown in FIG. 2 in which like parts are numbered with like numerals, and is provided with a frequency multiplier 30 to which one of the generated fundamental frequency signals is selectively applied. In FIG. 3, the frequency multiplier 30 comprises a resonance circuit as denoted by L and C in parallel relationship to each other, a transistor 31 coupled in series to the resonance circuit and an RC circuit 32 and 33. Let us denote the input frequencies $f_1$ and $f_2$, respectively, for the separate channels 1 and 2, and various harmonics of the input frequency are obtained as is known in the art. In accordance with the invention the frequency of the resonance circuit LC is chosen at a point intermediate of the frequencies of the harmonics of given order, i.e. one of the output frequencies (that are integral multiples of the input frequency) of the channel 1 and the frequency of the harmonics of the given order of the channel 2. In other words, the pass band of the resonance circuit is chosen so that its peak value is located intermediate of frequencies $nf_1$ and $nf_2$, where n is a number representing the order of harmonics. If two channels are used, the pass band has its peak value located as shown in FIG. 4, preferably in the neighborhood of the midpoint between frequencies $2f_1$ and $2f_2$. With an input signal being applied, the frequency multiplier 30 generates an output signal having a frequency which is an integral multiple of the input frequency, i.e. resonance occurs at a frequency which is an integral multiple of the input frequency. It should be noted that the pass band of the resonant circuit as plotted against frequency should decay at a rate so as to enable resonance to occur at frequencies $nf_1$ and $nf_2$ with an equal signal strength. Although in the present embodiment, only two channels are mentioned, it is understood that more than two video carriers are obtained in a single frequency multiplier in so far as the pass band of the resonant circuit enable resonance to occur at frequencies $nf_1$ to $nf_m$, where m is the number of video carriers. It is apparent to those skilled in the art that the resonant circuit as shown in FIG. 3 may be replaced with a band-pass filter having a bandwidth encompassing the frequency range of desired video carriers.

Figure 5A:
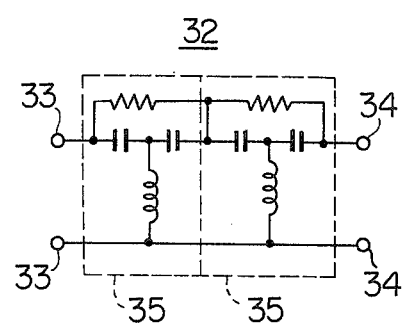
FIGS. 5a and 5b are circuit diagrams showing bridged-T networks in cascade connection and a bridged-T network with a resonant circuit in parallel connection.
Figure 5B:
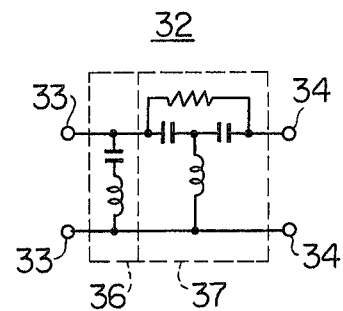

In another aspect of the invention, there is provided a trap circuit or band rejection filter 31 which comprises a filter such as shown in FIGS. 5a and 5b and is coupled to the output of balanced modulator 23. In FIG. 5a the filter 32 is made up of two bridged-T networks 35 in cascaded connection between the input and output terminals 33 and 34. These networks attenuate the unwanted lower side band signals resulting from the mixing of the video carriers with the sound signal in the balanced modulator 23 so that the wanted upper side band signals are allowed to pass therethrough to the band-pass filter 13. In FIG. 5b an alternative form of the filter circuit 32 is shown and comprises a resonant circuit 36 in parallel relationship with a bridged-T network 37. It is to be appreciated that instead of providing a plurality of trap circuits 24 and 25 and a changeover switch 26, the trap circuit 31 of FIG. 2 eliminates all the unwanted lower side band signals without the possibility of producing spurious noise as referred to above.

Figure 5C:
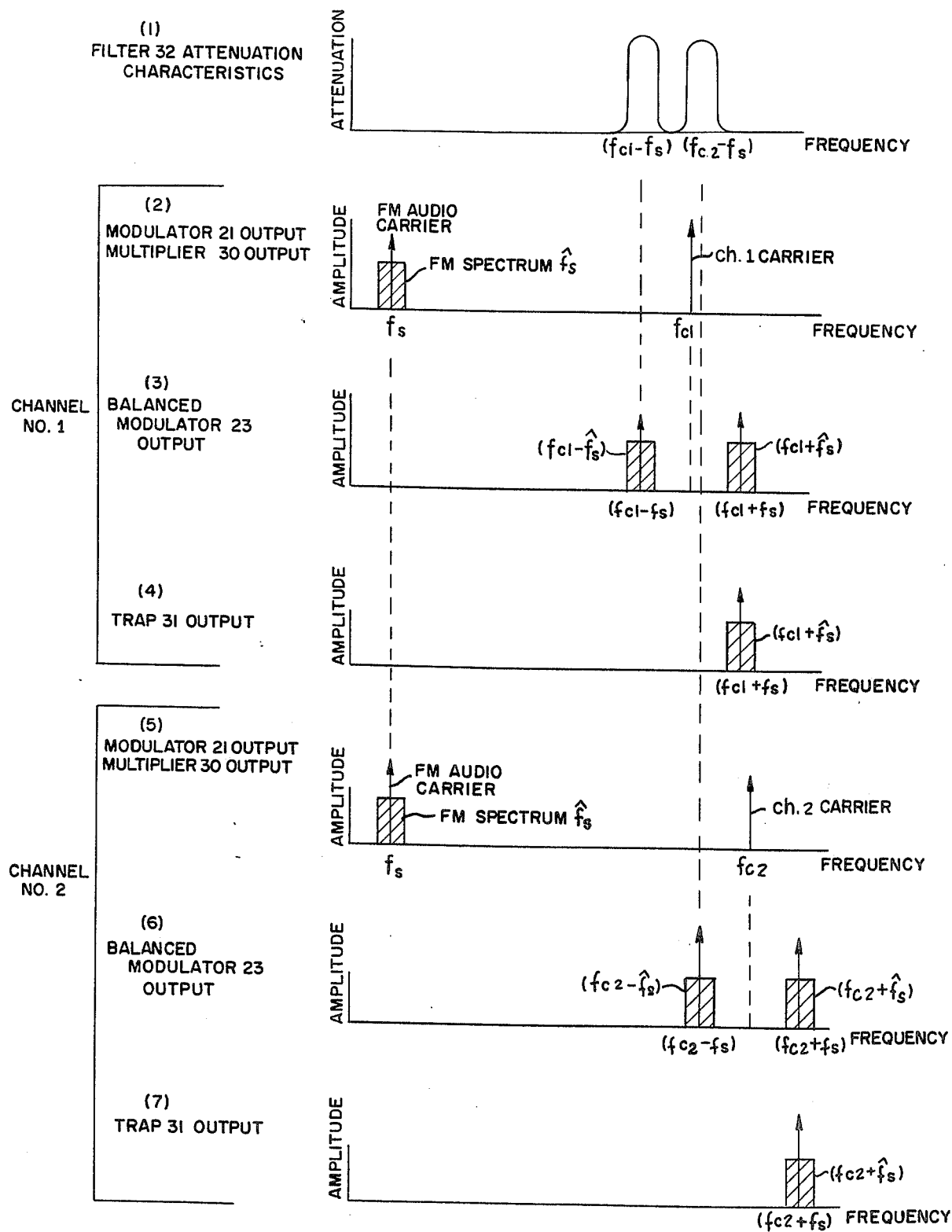
FIG. 5c illustrates the frequency spectra of the various signals developed within the embodiment of the invention shown in FIG. 2.

FIG. 5c illustrates the frequency spectra of various signals developed within the embodiment of the invention shown in FIG. 2, when the radio frequency converter is operating in either of two different channels. The attenuation characteristics of the filter 32 are also illustrated. The spectra will be described in conjunction with FIG. 2 in which the various frequency components developed in the outputs of the different stages of the radio frequency converter according to the invention are illustrated.

Channel 1 operation develops signals having spectra 2–4 in which the output frequency of oscillator 22 is represented by $f_s$, the output frequency of frequency modulator 21 is represented by $f_s$ plus an FM spectrum $\hat{f}_s$, and the output of frequency multiplier 30 develops two different frequencies in accordance with the setting of frequency control switch 19, which are respectively designated $f_{c1}$ and $f_{c2}$. The output frequency of frequency multiplier 30 defines the carrier frequency and is applied to the balanced modulator 23. The balanced modulator 23 develops upper and lower sidebands centered about the channel 1 carrier frequency $f_{c1}$. As shown by spectrum 3 in FIG. 5c, the upper and lower sidebands each include the FM spectrum $\hat{f}_s$ which is respectively centered about $f_{c1}-f_s$ and $f_{c1}+f_s$. However, the trap 31 has attenuation charateristics centered on the lower sidebands so that only the upper sideband pass therethrough and are applied to the band pass filter 13.

The operation of the radio frequency converter on channel 2 is identical with the operation on channel 1, except that switch 19 is set so that the frequency multiplier 30 develops an output frequency $f_{c2}$ which is equal to the frequency of the channel 2 carrier. When the carrier frequency $f_{c2}$ is applied to the balanced modulator 23 the balance modulator 23 develops an output signal having the frequency spectrum 6. The trap 31 also has attenuation charateristics centered on the lower sidebands of the output of the balanced modulator 23 so that only the upper sidebands pass through the trap 31, as shown by the spectrum 7.

Figure 6:
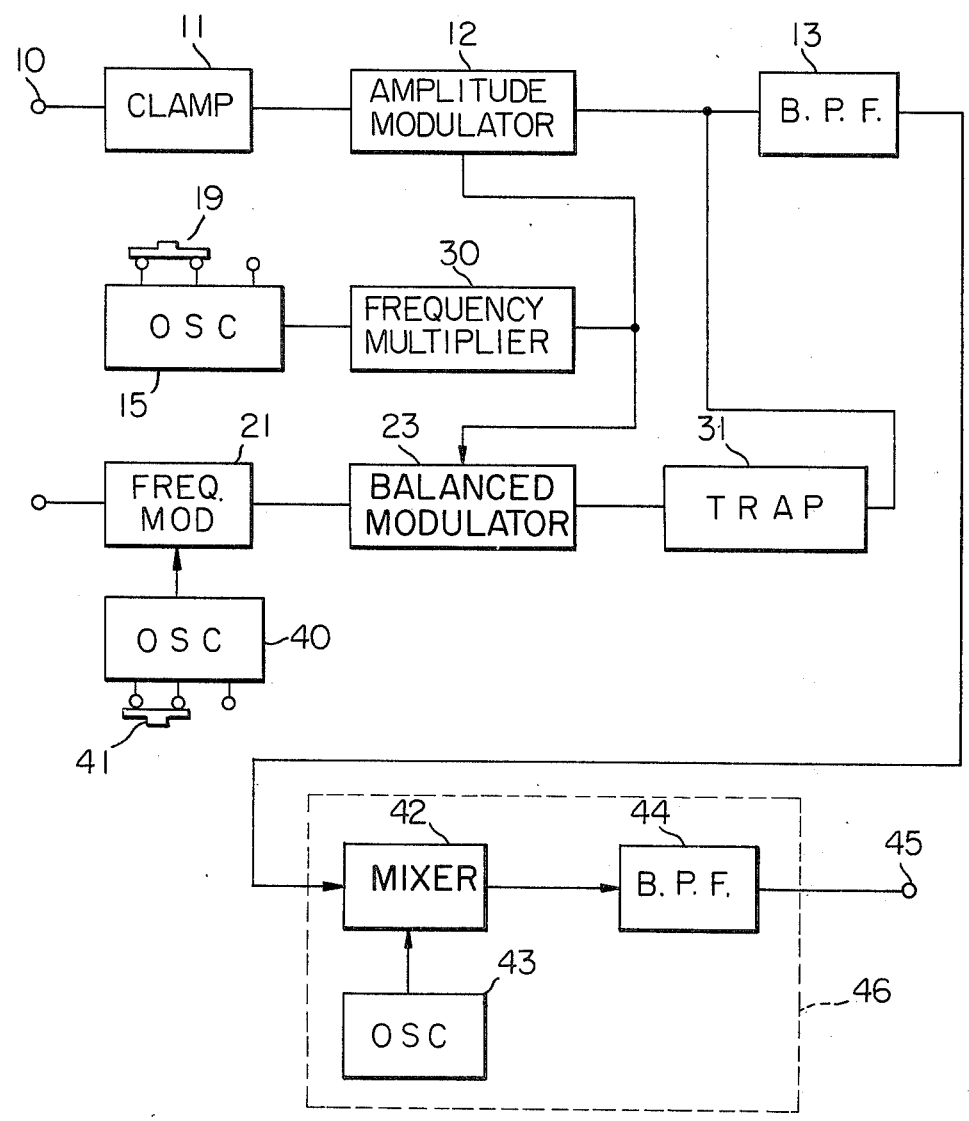
FIG. 6 is a schematic circuit diagram of a radio frequency converter of the present invention in the ultra-high frequency range.

In FIG. 6 there is shown another radio frequency converter adapted for use with a ultra-high frequency image pick-up system. The circuit configuration of FIG. 6 is similar to that shown in FIG. 2 except that an oscillator 40 having a changeover switch 41 which causes the oscillator to selectively produces signals is provided, and that the output signal through the band-pass filter 13 is applied to a ultra-high frequency converter 46. With the switch 41 being provided, the oscillator 40 is capable of selectively generating different sound carriers each being allotted to different service areas. Whereas in prior art radio frequency convertors, there is the need for providing additional oscillators in order to tune to the sound carriers particular to different localities when the image pick-up system is shifted from one location to another. In a known manner the video and sound signals passing through the band-pass filter is applied to a mixer 42 to which a ultra-high frequency carrier is supplied from an oscillator 43. The UHF carrier is mixed with the video and sound signals in the VHF band. Thus, the VHF signal is converted into an UHF band video and sound signal.

What is claimed is:
1. A radio frequency converter for converting an applied video signal and audio signal to sideband frequencies of a selected one of a plurality of frequencies defining separate frequency channels, comprising:
   an oscillator having a controllably variable frequency output signal;
   frequency multiplying means comprised of a single wideband frequency multiplier receptive of said oscillator output signal for developing an output signal having frequency components equal to multiples of the frequency of said oscillator output signal, the output signal frequency components defining a plurality of frequency channels selectible by controlling said oscillator output signal frequency;
   a modulator receptive of a video signal and said frequency multiplying means output signal for modulating the frequency multiplying means output signal to develop video signal sidebands;
   a balanced modulator receptive of a modulted audio signal and said frequency multiplying means output signal of mixing the two signals to develop audio signal sidebands; and filtering means receptive of the modulated output signals from said modulator and said balanced modulator for filtering unwanted sidebands from the modulated signals.

2. A radio frequency converter according to claim 1, further comprising a second oscillator and a frequency modulator receptive of said audio signal and the output signal of said second oscillator for frequency modulating the output signal of said second oscillator in accordance with the said audio signal and applying the output of said frequency modulator to said balanced modulator.

3. A radio frequency converter according to claim 2, wherein said second oscillator is a controllable oscillator having a controllably variable frequency output signal.

4. A radio frequency converter according to claim 1, wherein said wideband frequency multiplier includes a resonant output circuit having a bandwidth from the lowest to the highest frequency of said frequency multiplying means output signal frequency components.

5. A radio frequency converter according to claim 4, wherein said oscillator having a controllably variable frequency output signal develops an output signal having one of two selectible discrete frequencies to define two frequency channels, and wherein said resonant circuit has a pass band having a maximum at a frequency substantially midway between a lowermost multiple of said discrete frequencies and an uppermost multiple of said discrete frequencies.

6. A radio frequency converter according to claim 5, wherein said resonant circuit has a pass band having a maximum at a frequency substantially midway between the same order multipler of said two discrete frequencies.

* * * * *